No. 776,055. PATENTED NOV. 29, 1904.
W. D. GROSJEAN & W. G. EHRMANTRAUT.
CUSHION TUFTING MACHINE.
APPLICATION FILED AUG. 1, 1904.
NO MODEL. 2 SHEETS—SHEET 1.

WITNESSES.
Rich. A. George
Emma S. Hisse

INVENTORS
WALLACE D. GROSJEAN.
WILLIAM G. EHRMANTROUT.
By Robinson, Martin & Jones
ATTORNEYS.

No. 776,055. PATENTED NOV. 29, 1904.
W. D. GROSJEAN & W. G. EHRMANTRAUT.
CUSHION TUFTING MACHINE.
APPLICATION FILED AUG. 1, 1904.
NO MODEL. 2 SHEETS—SHEET 2.

WITNESSES
Rich. A. George
Emma S. Hesse

INVENTORS
WALLACE D. GROSJEAN
WILLIAM G. EHRMANTROUT.
BY Robinson, Martin & Jones
ATTORNEYS.

No. 776,055.

Patented November 29, 1904.

UNITED STATES PATENT OFFICE.

WALLACE D. GROSJEAN AND WILLIAM G. EHRMANTRAUT, OF ONEIDA, NEW YORK, ASSIGNORS OF ONE-THIRD TO CHARLES A. LEE, OF ONEIDA, NEW YORK.

CUSHION-TUFTING MACHINE.

SPECIFICATION forming part of Letters Patent No. 776,055, dated November 29, 1904.

Application filed August 1, 1904. Serial No. 219,027. (No model.)

*To all whom it may concern:*

Be it known that we, WALLACE D. GROSJEAN and WILLIAM G. EHRMANTRAUT, both of Oneida, in the county of Madison and State of New York, have invented certain new and useful Improvements in Cushion-Tufting Machines; and we do hereby declare that the following is a full, clear, and exact description of the invention, which will enable others skilled in the art to which it appertains to make and use the same, reference being had to the accompanying drawings, and to the characters of reference marked thereon, which form part of this specification.

The object of our invention is to provide a machine for conveniently and expeditiously tufting cushions, and particularly such cushions as are used in connection with so-called "Morris" chairs.

Figure 1:
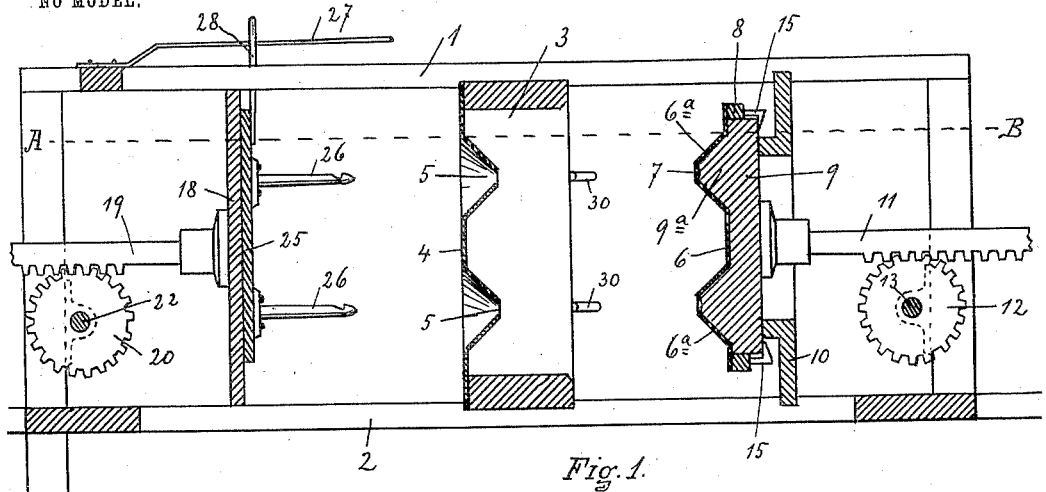
Figure 4:
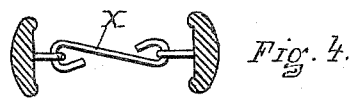
Figure 5:
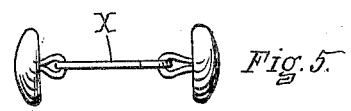
Figure 2:
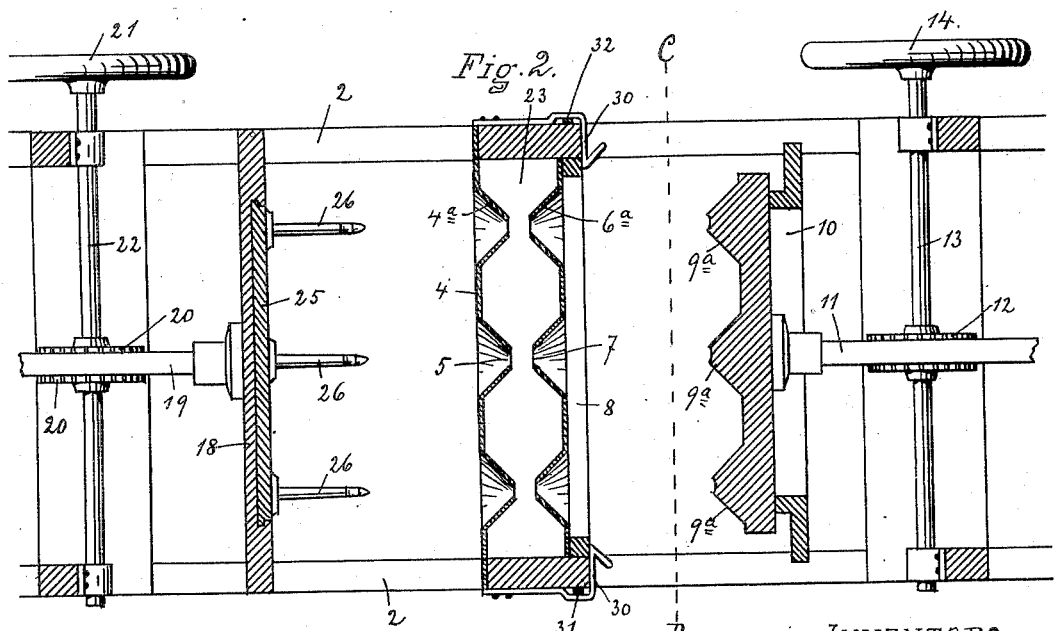
Figure 3:
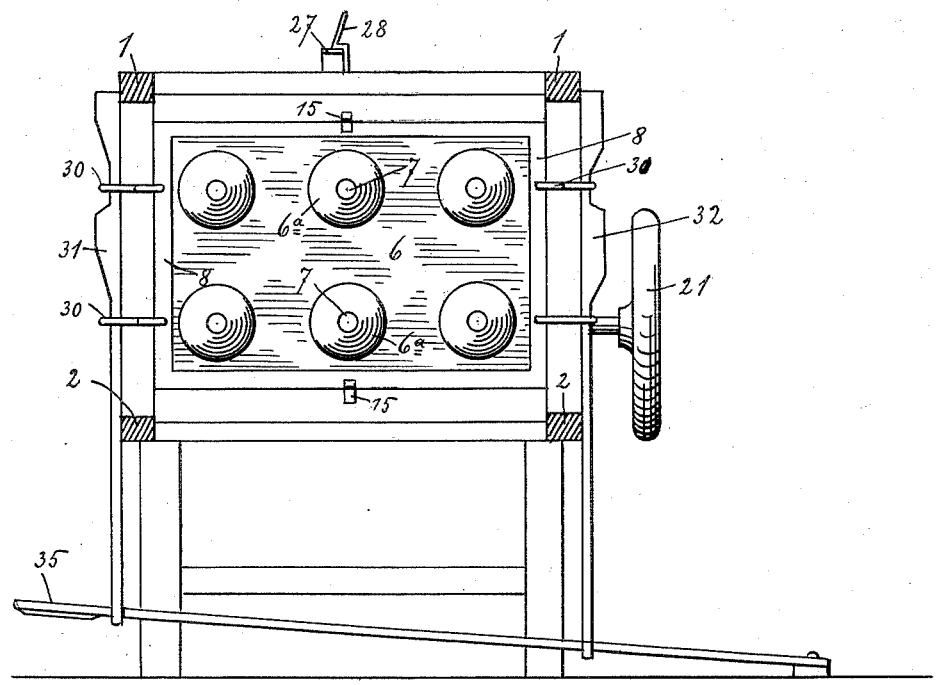
Figure 6:
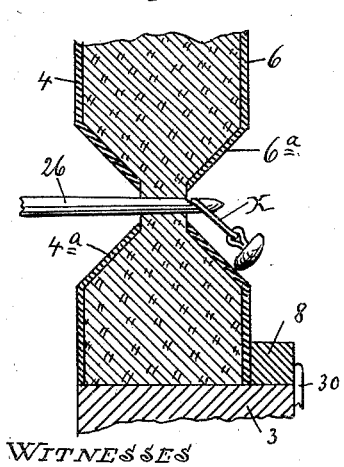
Figure 7:
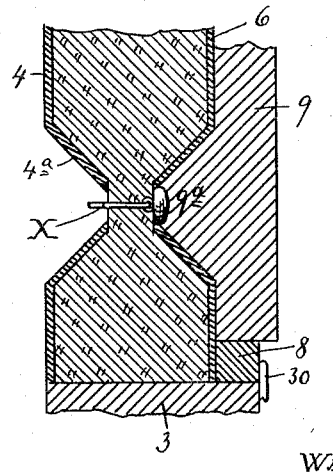
Figure 8:
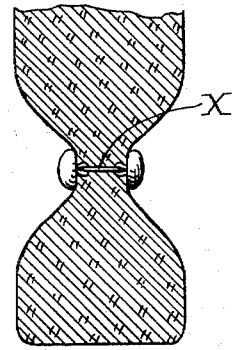

In the drawings, Figure 1 shows a vertical section of a machine embodying the features of our invention. Fig. 2 shows a horizontal section taken on line A B of Fig. 1, also showing the parts below the section-line. Fig. 3 shows a section taken on lines C D of Fig. 2 with the parts to the left of the section-line. Fig. 4 shows, partially in section, the arrangement of buttons and links for producing the tufting and such as is employed in connection with our machine. Fig. 5 shows another view of the same buttons and links. Fig. 6 shows, in enlarged detail, portions of the device and the manner in which the machine operates. Fig. 7 shows in a similar manner the operation at another stage. Fig. 8 shows an enlarged detail of a portion of a cushion after being operated upon by the machine.

The frame of the machine consists mainly of four corner-bars 1 1 and 2 2, which we prefer to arrange in a horizontal position and support upon suitable legs at a convenient height for convenient operation. Supported substantially in the middle of the machine, between frame-bars 1 1 and 2 2, there is a casing 3 of the proper form and size to receive the cushion to be operated upon. At one side the casing 3 is provided with a compression-plate 4, having funnel-shaped projections $4^a$. These funnel-shaped projections $4^a$ are preferably hollow, as shown, and particularly provided with the opening 5, which is of suitable size and arranged to allow the passage of the tufting-buttons used, as will hereinafter appear. The second compression-plate 6 is also provided with similar funnel-shaped projections $6^a$, coinciding in position with projections $4^a$ of the plate 4. These funnel-shaped projections $6^a$ are also provided with openings 7 similar to 6, before mentioned. The compression-plate 6 is provided with a frame 8, which gives strength to the plate and serves for other purposes, as will hereinafter appear. A follower 9 is provided, which is of a form and size to receive the frame 8 and is also provided with projections $9^a$, which are adapted to be received in the hollow side of the funnel-shaped projections $6^a$ and preferably quite closely fit the same. The follower 9 is supported by a slide-frame 10, which has bearings on the frame-bars 1 1 and 2 2, and the follower moves backward and forward by means of the rack-bar 11, attached to the back and the gear-pinion 12. The pinion 12 is mounted on a shaft 13, supported in suitable bearings in the frame, and the shaft and gear 12 are manipulated by means of a hand-wheel 14, although any other suitable means, including means for the application of power, may be provided in lieu of the hand-wheel 14. The frame 8, with the compression-plate 6, may be secured on the follower 9 by suitable catches, as 15, provided for that purpose. In the frame at the opposite side of the casing or compression-chamber 3 from the follower 9 there is provided a reciprocating head 18, provided with a rack-bar 19, which engages with the gear-pinion 20. The head 18 finds bearings on the frame-bars 1 and 2 and is operated by means of the hand-wheel 21 on the shaft 22, which has bearings in the frame and on which the gear-wheel 20 is secured. The head 18 is provided with a movable plate 25, in which are secured a suitable number of needles 26 in number and arrangement to correspond with the funnel-shaped projections 4ª of the compression-plate 4. The needle-plate 25 is movable vertically, as the device is shown, a limited distance and is supported in its upper position so that the needles register with the openings 5 in the compression-plate 4 by means of a bar 27, which is preferably a spring and a hook 28, provided on the plate 25, and adapted to engage with and slide along the bar 27. On the walls or casing of the compression-chamber 3 there are provided a number of spring-catches 30, adapted to engage with the frame 8 of the movable compression-plate and secure it in position in the compression-chamber.

For disengaging the catches 30 there are provided on each side of the machine vertical slides 31 and 32, having inclined faces adapted to engage with the catches 30, respectively, and force them into open positions. For operating these slides 31 and 32 there may be provided a treadle 35, to which a downward extension of the slides 31 and 32 may be respectively connected.

The cushions to be operated on are brought to the machine in a completed form preferably, except for the tufting to be performed by this machine. The pads are placed in the compression-chambers 3 when the follower 9 is withdrawn and while it is carrying the compression-plate 6 with its frame 8. When the pad has been suitably placed in the compression-chamber, the follower 9 is moved up with its mechanism and forced against the pad until the frame 8 is caught by the catches 30. The follower is then withdrawn, when the parts are in the position shown in Fig. 2. The needles are then moved up by the mechanism provided for that purpose and forced through that portion of the pad or cushion which is confined between the coinciding ends of the funnel-shaped projections 4ª and 6ª. After the needles have been forced through the operator attaches the link X with one button, as shown in Fig. 6. It may be here noted that the needles are provided with a hook to receive the link. After the links have been attached the needles are withdrawn by a reverse operation of the mechanism which forced them through the pad. At the time that the needles are forced through the pad and when the head 18 is in the position necessary to have the needles in that position the hook 28 has become disengaged from the supporting bar or spring 27. When the head, with the needles, is withdrawn, as soon as the needles becomes disengaged the needle-plate 25 drops down, carrying the needles out of their normal position, which is in the direct line with the openings 5, and in so doing unhooks or releases the needles from the links X. The follower 9 is again brought up by means of its operating mechanism, and the projection 9ª engages with the button on the link and forces it well into position in the pad and in the opening 7 through the funnel-shaped projection of the compression-plate. The parts in this position are shown in Fig. 7. The operator now places on the other button, placing it in the somewhat open hook of the link X. When this has been done, the catches 30 are released and the catches 15 engaged with the follower 9 and the follower withdrawn, carrying with it the compression-plate 6. When the follower, with the compression-plate 6, is removed, the cushion can be removed from the compression-chamber, the buttons which have been attached on the side of the compression-plate 4 passing through the openings 5. Of course it will be understood that the cushion is compressed somewhat more tightly than is desired for its final position; but after it is relieved from the pressure of the machine its elasticity will take up the extra length of the link X, which is provided to allow it to project sufficiently to attach the last button, as desired. When removed from the machine, the arrangement of the buttons, link, and cushion will be substantially as shown in Fig. 8. The needle-plate 25 is raised to its elevated position and secured on the bar 27 by the hook 28, when the apparatus is ready for a repetition of the operations before described.

What we claim as new, and desire to secure by Letters Patent, is—

1. The combination in a tufting-machine of compression-plates having funnel-shaped projections on the opposing surfaces, with means for moving same toward and from each other, substantially as set forth.

2. The combination in a tufting-machine of compression-plates having coinciding funnel-shaped projections on the opposing surfaces, with openings through the points of the projections, substantially as set forth.

3. The combination in a tufting-machine of compression-plates having coinciding funnel-shaped projections on their opposing faces, with openings suitable to afford a passage for the tufting-buttons in the points of the projections, means for moving the plates toward and from each other, needles arranged to be passed through the openings in the projections and means for operating the needles, substantially as set forth.

4. The combination in a tufting-machine of the character described, the combination of a compression-chamber having one side formed by a compression-plate with funnel-shaped inwardly-extending projections, a movable compression-plate having corresponding funnel-shaped projections adapted to be operated into the compression-chamber, and means for operating the movable compression-plate, a follower having projections entering the hollow funnel projections of the compression-plate, needles arranged to be passed through the compression-chamber and through the funnel-shaped projections, and means for operating the needles, substantially as set forth.

In witness whereof we have affixed our signatures, in presence of two witnesses, this 2d day of July, 1904.

WALLACE D. GROSJEAN.
WILLIAM G. EHRMANTRAUT.

Witnesses:
F. J. SKELTON,
W. R. WOODCOCK.